Feb. 7, 1956  F. M. REID ET AL  2,733,931
FIFTH WHEEL SUSPENSION FOR TRAILERS AND THE LIKE
Filed Jan. 8, 1953  3 Sheets-Sheet 1

INVENTORS.
Frederick M. Reid.
Hans Locker.
BY
Harness, Dickey & Pierce.
ATTORNEYS.

Feb. 7, 1956  F. M. REID ET AL  2,733,931
FIFTH WHEEL SUSPENSION FOR TRAILERS AND THE LIKE
Filed Jan. 8, 1953  3 Sheets-Sheet 2
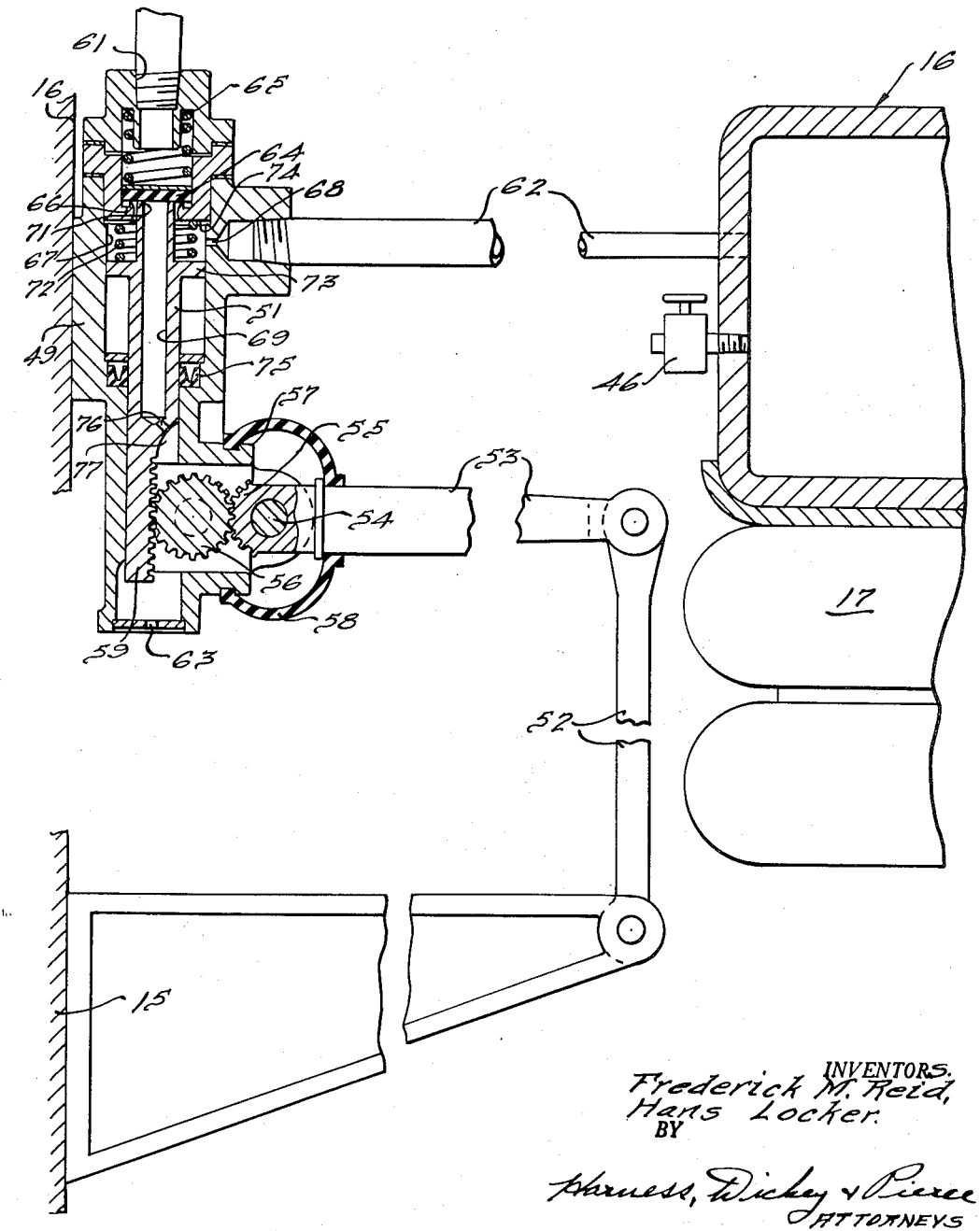
INVENTORS.
Frederick M. Reid,
Hans Locker.
BY
Harness, Dickey & Pierce
ATTORNEYS Feb. 7, 1956 F. M. REID ET AL 2,733,931
FIFTH WHEEL SUSPENSION FOR TRAILERS AND THE LIKE
Filed Jan. 8, 1953 3 Sheets-Sheet 3
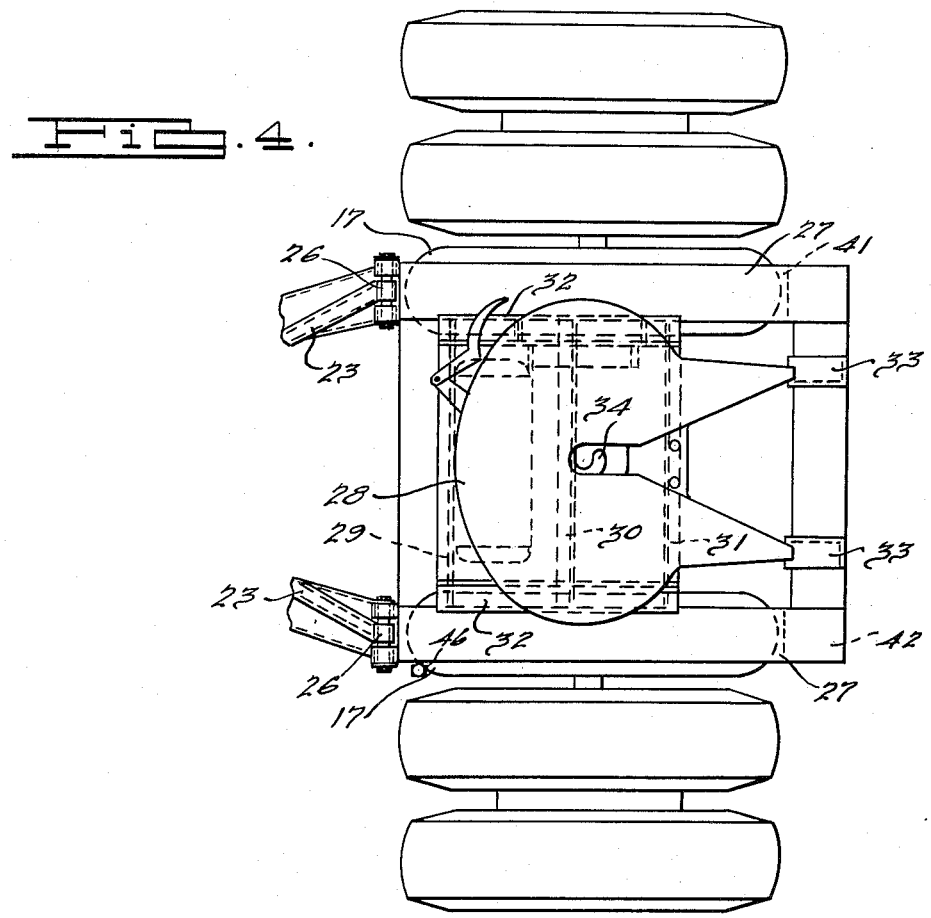
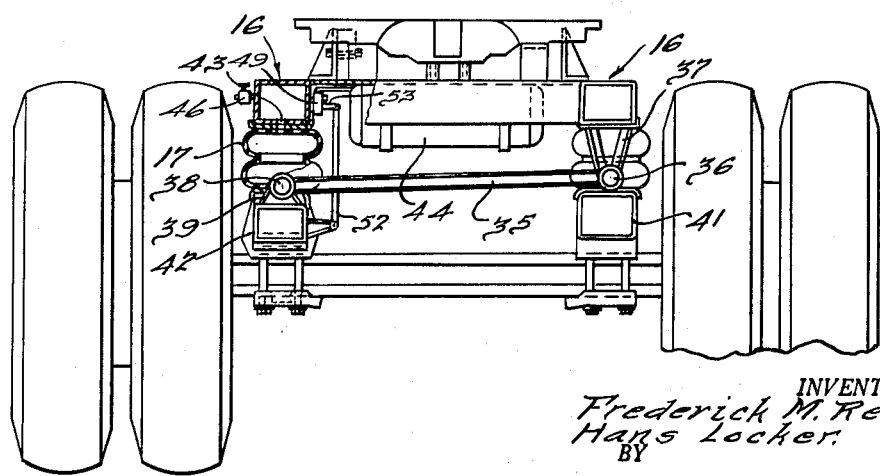
INVENTORS.
Frederick M. Reid,
Hans Locker.
BY
Harness, Dickey & Pierce
ATTORNEYS.

United States Patent Office 2,733,931
Patented Feb. 7, 1956

2,733,931

FIFTH WHEEL SUSPENSION FOR TRAILERS AND THE LIKE

Frederick M. Reid, Grosse Pointe, and Hans Locker, Utica, Mich., assignors to Fruehauf Company, Detroit, Mich., a corporation of Michigan Application January 8, 1953, Serial No. 330,258

7 Claims. (Cl. 280—44)

This invention relates to supports and suspension means for trailers, and more particularly to fifth wheel attachments of the dolly type having means for yieldably supporting the front end of the trailer.

It is an object of this invention to provide an improved trailer attachment for converting a semitrailer to a full trailer, which facilitates coupling of the tractor to a loaded trailer. In connection with this object, the invention contemplates the provision of an improved fifth wheel suspension by means of which the fifth wheel can be readily lowered, thereby allowing the fifth wheel to be easily positioned under the apron plate of a loaded trailer.

It is another object to provide an improved fifth wheel attachment having the above characteristics, and in which the fifth wheel is supported for rocking or articulated movement in a floating manner without a fixed hinge axis, whereby the vehicle has softer riding qualities when going over uneven terrain.

It is a further object to provide an improved fifth wheel suspension of the above nature, which provides an air cushion for the trailer, and in which the degree of cushioning will be automatically adjusted to compensate for changes of load in the trailer.

Other objects, features and advantages of the present invention will become apparent from the subsequent description, taken in conjunction with the accompanying drawings.

In the drawings:

Figure 3 is a detailed cross-sectional view of the control valve, with its associated parts shown schematically;

Figure 4 is a top plan view of the trailer attachment showing the fifth wheel parts; and Figure 5 is a rear elevational view of the trailer attachment with parts taken in cross-section, showing the lateral radius rod and the connection between the auxiliary frame-surge tank and the air springs.

Figure 1:
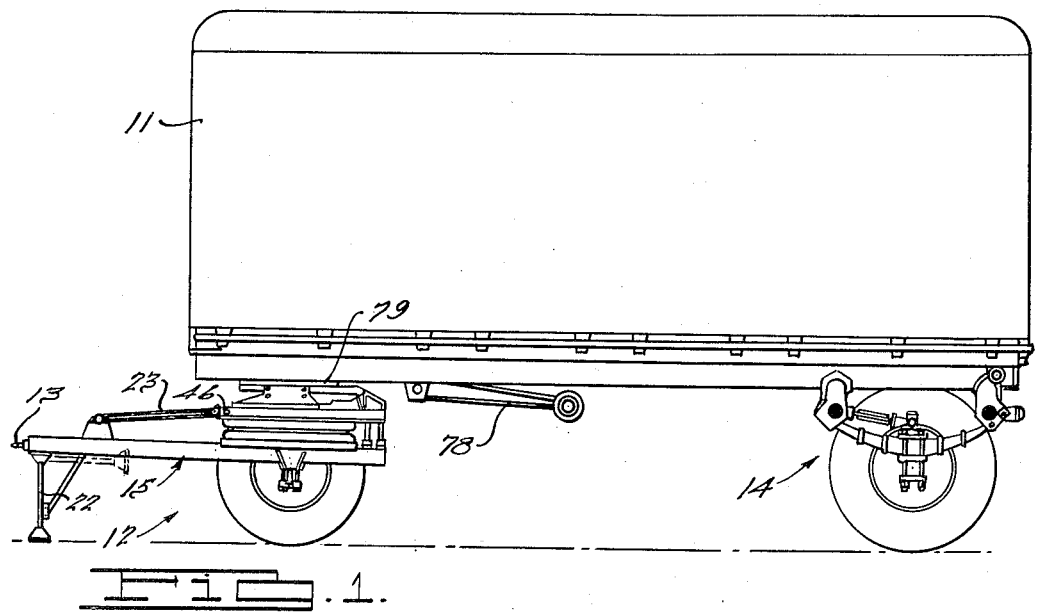
Figure 1 is a side elevational view of a trailer with the trailer support of this invention attached thereto.
Figure 2:
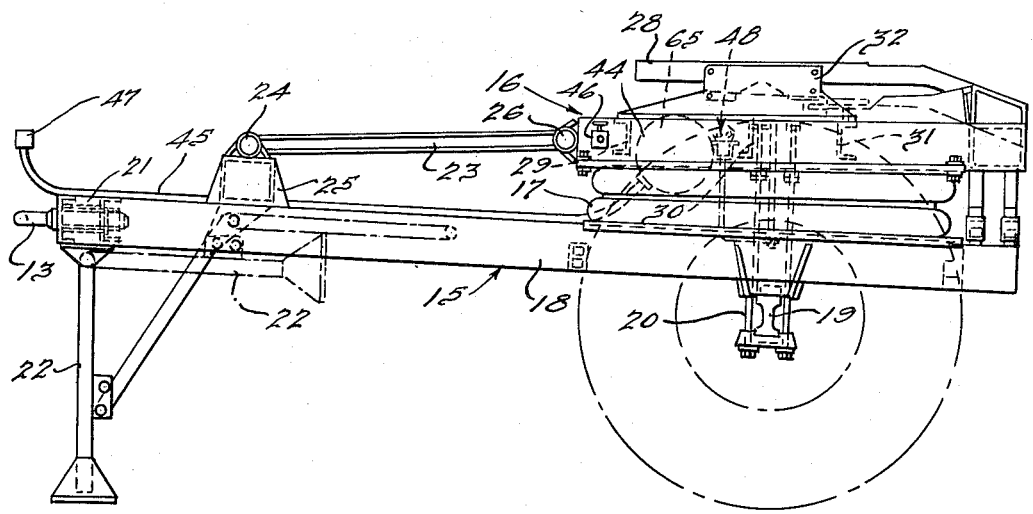
Figure 2 is a side elevational view of the trailer attachment showing the main and auxiliary frames with the fifth wheel, the air spring, the radius rods and the valve mounting.

The trailer attachment of this invention is shown in Figure 1 as connected to a trailer 11 and is generally indicated at 12. As shown, a coupling 13 such as a lunette is secured to the front end of the assembly for connection to the pintle hook of a tractor (not shown), and the rear of the trailer is shown as having a conventional type of suspension as indicated at 14 in Figure 1.

The trailer attachment 12 is of the dolly type and comprises in general a main frame 15 and a combined auxiliary frame-surge tank 16, referred to for brevity as a tank frame, which is supported in spaced relation above the main frame by a pair of air springs 17. The main frame comprises a pair of oppositely disposed members 18 such as box or channel members which extend in parallel relation at their rear portions and converge at their forward portions to support the lunette 13, and the tank frame is of substantially square shape and of airtight box member construction. It will be understood that only a portion of the tank frame could be airtight within the scope of the invention. The parallel portions of the main frame are secured to wheel axle 19 by fastening means 20, and the forward end 21 of the main frame carries a retractable auxiliary support or landing gear 22 which can be pivotally lowered from its dotted to its solid line position when the attachment is not being used. A pair of longitudinal radius rods 23 are pivoted at their converging forward ends 24 to the forward portion of the main frame, which carries a pedestal 25 for this purpose. The diverging ends of these rods are pivoted at 26 to the forward ends of side members 27 of the tank frame.

Rigidly secured to the tank frame 16 is a lower fifth wheel 28, the fifth wheel being connected to frame 16 by cross beams 29, 30 and 31 which support longitudinal brackets 32, these brackets in turn holding the fifth wheel. Reinforcing brackets 33 are provided on the frame 16 for supporting the rearwardly extending ramp portions of the fifth wheel, and a kingpin lock 34 is also provided for the upper fifth wheel or apron plate. The rear ends of the frames 15 and 16 are connected by a lateral radius rod 35, shown in Figure 5, which is pivoted at one end 36 to the tank frame by means of a downwardly extending bracket 37, and at the other end 38 to the main frame by means of a bracket 39. It should be noted that the right side frame member 41 of the main frame as seen in Figure 5 is slightly shorter than the left side frame member 42, to allow clearance for movement of bracket 37 in a vertical direction.

Referring now more particularly to the air springs 17, these comprise inflated rubber bellows of a known type which have an elongated shape, one bellows being disposed on each side between the main and tank frames. As shown in Figure 5, the tank frame, which as stated previously is of airtight box frame construction, has an air connection 43 to each of the air springs 17 so that the tank frame 16 acts as a surge tank for the bellows. Air for the springs and tank frame is furnished by a supply tank 44 which is preferably supported by the tank frame. This supply tank is for example connected to the air compressor system of the tractor (not shown) by a supply line 45 which may be the same line which supplies the trailer air brakes. A vent valve 46 is preferably provided in the tank frame for purposes hereinafter described, and the line has a conventional coupling 47 for connection to the compressor of the tractor.

Interposed in the connection between supply tank 44 and the tank frame is a control valve generally indicated at 48. The control valve body 49 is secured to tank frame 16, and the valve is preferably of the reciprocating type having a valve slide 51 movable within the valve body. Movement of the valve slide is controlled by the distance between the main and tank frames, and for this purpose a link 52 is pivoted at one end to main frame 15 and at the other end to a link 53. The latter link is pivoted at 54 to the valve body and carries a gear sector 55 which meshes with a gear 56 rotatably mounted in the valve body. An access opening 57 in the valve body is provided for gear sector 55, this opening being protected by a seal 58. A rack 59 is formed at one end of valve slide 51 and gear 56 meshes with this rack. It will therefore be seen that upon relative approaching movement between the tank and main frames, valve slide 51 will be moved upwardly within the valve body, and upon spreading movement of the frames the slide will move downwardly.

The valve body has a connection 61 to supply tank 44, and a connection 62 to the tank frame 16 which in turn of course is connected to the air springs by ports 43. The valve body is also provided with a vent opening 63 in a bottom cover for the housing. A valve disk 64 is provided in the upper portion of the valve body connected to port 61, the disk being urged by a coil spring 65 against a valve seat 66. Below seat 66 is a chamber 67 connected by port 68 to the air spring port 62. The diameter of valve disk 64 is smaller than that of its surrounding chamber, so that when it is lifted away from valve seat 66 compressed air will pass into chamber 67 and out through port 62 to further inflate the air springs.

Valve slide 51 has an axial passage 69 with a valve seat 71 at its upper end engageable with valve disk 64, seat 71 being inwardly spaced from seat 66. A spring 72 is provided in the valve body between a shoulder 73 on the valve slide 51, and a shoulder 74 provided in the valve body, spring 72 urging the valve slide away from the valve disk. Shoulder 73 also acts as a guide for the valve slide, and a sealing member 75 is provided in the valve body to prevent leakage of the compressed air. A vent passage is provided in the form of a port 76 at the lower end of passage 69 leading to a recessed portion 77 of the valve slide, port 76 therefore having an air connection with vent opening 63.

In operation, assuming the trailer attachment 12 to be initially disconnected from the trailer 11, the latter being supported by a conventional landing gear 78, vent valve 46 on the tank frame 16 is first opened, thereby deflating bellows 17 and allowing the fifth wheel 28 to be lowered. The vent valve 46 is then closed and the fifth wheel 28 positioned under the upper fifth wheel or apron plate 79 on the trailer 11.

Air coupling 47 is connected to the compressor system of the tractor, so that compressed air will flow through supply conduit 45 to supply tank 44. Assuming that the trailer is loaded, the initial deflated condition of air springs 17 will mean that the tank frame 16 and main frame 15 will be relatively close together. This means that link 53 will be rotated to a position such that valve slide 51 is moved upwardly from its position as shown in Figure 3. Valve disk 64 will be lifted away from valve seat 66, and the compressed air from supply tank 44 will enter the valve body through port 61, flow past valve disk 64, through valve seat 66 and into chamber 67. From there the compressed air flows through port 68 and connection 62 to the tank frame 16, the compressed air flowing from the tank frame through ports 43 into the air springs, which will gradually inflate. As the air springs inflate, tank frame 16 will be lifted away from main frame 15, so that fifth wheel 28 engages apron plate 79 and lifts the front end of the trailer. At the same time, link 53 will move toward a position in which valve slide 51 is as shown in Figure 3. When such a position is reached, valve disk 64 will engage valve seat 66, shutting off the air flow to the tank frame. The air springs will then be inflated to an amount proper for supporting the load which the trailer carries, and the main and tank frames will be separated a normal amount.

It is obvious that with lighter loads a lesser degree of inflation is desired in the air springs in order to maintain good riding qualities. Should a portion of the original trailer load be removed, the initial result will be an expansion of the air springs, which will result in a separation of tank frame 16 and the main frame. This separation will rock link 53 clockwise as shown in Figure 3, lowering valve slide 51 within the valve body. Valve seat 71 will thus be withdrawn from valve disk 64, and the compressed air within tank frame 16 and air springs will re-enter the valve body through port 68, enter axial passageway 69 and will be vented through ports 76 and 63. As the air is released, the distance between the tank and main frames will decrease, until valve seat 71 again engages valve disk 64. At this point the discharge of air from the air springs will be terminated and the trailer attachment will be adjusted for its new load conditions.

If an additional load should be placed in the trailer, the tank frame will be initially moved closer to the main frame, resulting in a counterclockwise movement of link 53 and an upward movement of valve slide 51. Thus valve disk 64 will be lifted away from valve seat 66 and additional air under compression will enter the tank frame 16. The air springs will thus be inflated a sufficient amount to carry the additional load, and the resultant separation of the tank frame from the main frame will eventually close valve disk 54 against valve seat 66.

While the tractor is towing the trailer, the valve 48 will normally be in the position shown in Figure 3, with the air sealed within the tank frame 16 and air springs 17. When road shocks are encountered, the air springs will be momentarily compressed, and the tank frame acting as a surge tank will absorb the changes in air pressure. Should the valve slide 51 be moved due to road vibrations, so as to cause air to enter or leave the surge tank, the resultant change in air pressure in the air springs will adjust the relative positions of the main and tank frames so as to readjust the amount of air in the system.

It will be noted that the fifth wheel 28 is supported in a floating manner for rocking or articulated movement by means of the pair of bellows 17, so that the front end of the trailer can move in a floating or non-pivoted manner, without a fixed hinge axis, being restricted by the radius rods 23 and 35 in a lateral and a longitudinal direction. When the vehicle is going over uneven terrain, this type of movement will result in substantial reduction of road shocks and jars, thereby imparting smooth riding qualities to the trailer.

When it is desired to remove the trailer attachment from the trailer, the trailer landing gear 78 is lowered and the vent valve 46 on tank frame 16 is opened, thus allowing discharge of compressed air from the tank frame, the supply tank 44 and the bellows 17. The fifth wheel 28 will thus be lowered away from the apron plate 79 of the trailer 11 by its own weight, the trailer being thereafter supported by landing gear 78, and the attachment 12 may be removed and supported independently by its own landing gear 22.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In an attachment for trailers, a main frame, means for attaching road wheels to said main frame, a fifth wheel spaced above said main frame, a bellows type spring interposed between said fifth wheel and said main frame, said spring serving to support said fifth wheel for movement with respect to said main frame, means for supplying said spring with compressed air, control means for said air supply, means interconnecting said control means with said main frame and said fifth wheel, said interconnecting means being actuatable by relative movement between said main frame and said fifth wheel whereby the amount of air in said spring is determined by the load on said fifth wheel, and vent means for said spring whereby said fifth wheel may be lowered with respect to said main frame independently of said control means.

2. The combination according to claim 1, further provided with an auxiliary frame having an airtight enclosed portion, said fifth wheel being mounted on said auxiliary frame, and an air connection between said spring and the airtight enclosed portion of said auxiliary frame.

3. In an attachment for trailers or the like, a main frame, means for attaching road wheels to said main frame, means for connecting said main frame to a tractor, an auxiliary frame spaced above said main frame, said auxiliary frame having an airtight enclosed portion, a fifth wheel secured to said auxiliary frame, a pair of laterally spaced bellows type springs interposed between said auxiliary and main frames, said spring serving to support said auxiliary frame for non-pivotal movement with respect to said main frame, means for supplying compressed air to said bellows type springs, air connections between said springs and the airtight enclosed portion of said auxiliary frame, and vent means for said airtight enclosed portion, whereby said fifth wheel may be lowered with respect to said main frame.

4. The combination according to claim 3, further provided with control means for said compressed air supply, means interconnecting said control means with said main and auxiliary frames, said interconnecting means being actuatable by relative movement between said main and auxiliary frames whereby the amount of air in said bellows type springs is determined by the load on said auxiliary frame.

5. In a fifth wheel attachment for trailers, a main frame having a pair of side frame members, means for attaching road wheels to said main frame, means for coupling said main frame to a tractor, an auxiliary frame having side frame members disposed above said main frame side members, a fifth wheel carried by said auxiliary frame and positioned for connection to a trailer, a pair of elongated bellows type springs disposed between corresponding side members of said main and auxiliary frames, valve means for controlling the amount of air in said springs, operating means for said valve means controlled by relative movement between said main and auxiliary frames, said operating means including means for reducing the amount of air in said springs when said frames are further separated and means for increasing the amount of air in said springs when said frames are moved closer together, and vent means for said springs operable independently of said valve means whereby said auxiliary frame and fifth wheel may be lowered with respect to said main frame.

6. In a fifth-wheel dolly for trailers, a frame, ground-engaging wheels supporting said frame, a fifth wheel spaced above said frame, air spring means interposed between the frame and said fifth wheel adapted to support the latter and to carry the load imposed on said fifth wheel when the dolly is coupled to a trailer, and air-pressure means acting through said spring for selectively adjusting the relative vertical spacing between the fifth wheel and the frame to assist in coupling and uncoupling the latter.

7. A fifth-wheel dolly for trailers comprising a frame, ground-engaging wheels supporting said frame, a fifth wheel, air springs on said frame supporting said fifth wheel, means for introducing air under pressure into said air springs, and valve-controlled vent means for said air springs operative to at least partially collapse said springs so as to lower the fifth wheel and thus facilitate coupling and uncoupling thereof.

References Cited in the file of this patent

UNITED STATES PATENTS

| | | |
|---|---|---|
| 1,348,241 | Press | Aug. 3, 1920 |
| 1,743,436 | Davis et al. | Jan. 14, 1930 |
| 2,290,620 | Brown | July 21, 1942 |
| 2,361,575 | Thompson | Oct. 31, 1944 |
| 2,470,676 | Aldous | May 17, 1949 |
| 2,531,871 | Braunberger | Nov. 28, 1950 |
| 2,590,962 | Gurton | Apr. 1, 1952 |